United States Patent

Maeda et al.

(10) Patent No.: US 6,756,154 B2
(45) Date of Patent: Jun. 29, 2004

(54) CATHODE ACTIVE MATERIAL FOR NON-AQUEOUS ELECTROLYTE SECONDARY CELL AND PROCESS FOR PRODUCING THE SAME

(75) Inventors: Hideaki Maeda, Ube (JP); Shoichi Fujino, Onoda (JP); Mitsuaki Hatatani, Ube (JP); Hiroyasu Watanabe, Ube (JP); Norimiki Sugiyama, Ube (JP); Hideaki Sadamura, Onoda (JP)

(73) Assignee: Toda Kogyo Corporation, Hiroshima-ken (JP)

( * ) Notice: Subject to any disclaimer, the term of this patent is extended or adjusted under 35 U.S.C. 154(b) by 58 days.

(21) Appl. No.: 09/994,903

(22) Filed: Nov. 28, 2001

(65) Prior Publication Data

US 2002/0098416 A1 Jul. 25, 2002

(30) Foreign Application Priority Data

Nov. 29, 2000 (JP) ........................................ 2000-363511

(51) Int. Cl.⁷ .......................... H01M 4/58; H01M 4/50; C01D 1/02; H01B 1/02
(52) U.S. Cl. ............... 429/231.3; 429/224; 429/231.95; 423/594.6; 423/594.15; 423/599; 252/521.2; 252/519.15; 252/182.1
(58) Field of Search ............................ 429/231.95, 224, 429/231.6, 231.3, 231.1; 423/599, 594.6, 594.5, 594.15, 594.16, 592.1; 252/519.15, 519.1, 521.2, 513, 182.1

(56) References Cited

FOREIGN PATENT DOCUMENTS

| EP | 0 867 408 A1 | 9/1998 | |
| EP | 0 997 956 A1 | 5/2000 | |
| EP | 1154503 | * 11/2001 | ............ H01M/4/48 |
| JP | 4-237968 | * 8/1992 | .......... H01M/10/40 |
| JP | 11-67209 | * 3/1999 | ............ H01M/4/58 |

OTHER PUBLICATIONS

Patent Abstracts of Japan, vol. 2000, No. 05, Sep. 14, 2000 & JP 2000 048818 A, Feb. 18, 2000.

* cited by examiner

*Primary Examiner*—Raymond Alejandro
(74) *Attorney, Agent, or Firm*—Nixon & Vanderhye P.C.

(57) ABSTRACT

A cathode active material for a non-aqueous electrolyte secondary cell having a c-axis length of lattice constant of 14.080 to 14.160 Å, an average particle size of 0.1 to 5.0 μm, and a composition represented by the formula:

$$LiCo_{(1-x-y)}Mn_xMg_yO_2$$

wherein x is a number of 0.008 to 0.18; and y is a number of 0 to 0.18. This cathode active material is capable of maintaining an initial discharge capacity required for secondary cells and showing improved charge/discharge cycle characteristics under high temperature conditions.

8 Claims, No Drawings

CATHODE ACTIVE MATERIAL FOR NON-AQUEOUS ELECTROLYTE SECONDARY CELL AND PROCESS FOR PRODUCING THE SAME

BACKGROUND OF THE INVENTION:

The present invention relates to a cathode active material for a non-aqueous electrolyte secondary cell and a process for producing the active material, and more particularly, to a cathode active material for a non-aqueous electrolyte secondary cell which is capable of maintaining an initial discharge capacity required for secondary cells and showing improved charge/discharge cycle characteristics under high temperature conditions, and a process for producing such a cathode active material.

With the recent rapid development of portable and cordless electronic devices such as audio-visual (AV) devices and personal computers, it has been increasingly demanded to use as a power source thereof, secondary cells or batteries having a small size, a light weight and a high energy density. Under this circumstance, among the secondary cells, lithium ion secondary cells have been noticed because of advantages such as high charge/discharge voltages as well as high charge/discharge capacities.

Hitherto, as cathode active materials useful for high energy-type lithium secondary cells exhibiting a 4V-grade voltage, there are generally known $LiMn_2O_4$ having a spinel structure, $LiMnO_2$ having a corrugated layer structure, $LiCoO_2$ having a layered rock salt-type structure, $LiCo_{1-x}Ni_xO_2$, $LiNiO_2$ or the like. Among secondary cells using these active materials, lithium ion secondary cells using $LiCoO_2$ are more excellent because of high charge/discharge voltages and high charge/discharge capacities. These lithium ion secondary cells have been, however, required to be further improved in properties thereof.

Specifically, when the lithium ion secondary cell using $LiCoO_2$ as an active material is repeatedly subjected to charge/discharge cycles, the discharge capacity of the secondary cell tends to be deteriorated. This is because $LiCoO_2$ undergoes Jahn-Teller distortion due to conversion of $Co^{3+}$ of $LiCoO_2$ into $Co^{4+}$ when lithium ions are released therefrom. As the amount of lithium released increases, the crystal structure of the active material is transformed from hexagonal system into monoclinic system, and further from monoclinic system into hexagonal system. In addition, when such release and insertion reactions of lithium ions are repeated, the lattice of $LiCoO_2$ suffers from contraction and expansion, resulting in destruction of the crystal structure of $LiCoO_2$. As a result, it is assumed that the charge/discharge cycle characteristics of the secondary cell are deteriorated.

Also, when the secondary cell is repeatedly subjected to charge/discharge reactions (i.e., release and insertion reactions of lithium ions), the crystal structure of the active material becomes unstable, thereby causing release of oxygen from the crystal lattice, or undesired reaction with an electrolyte solution. Further, the reaction with an electrolyte solution is more active under high temperature conditions. Therefore, in order to ensure safety of the secondary cell, it has been required to provide active materials exhibiting a stable structure and a high heat stability even under high temperature conditions.

Since electronic devices using the secondary cell as a power source, such as note-type personal computers, are exposed to high temperature due to heat generation upon use, it has been required to provide secondary cells showing excellent charge/discharge cycle characteristics even under high temperature conditions.

Also, the secondary cell using $LiCoO_2$ can be operated with a high voltage. However, since the $LiCoO_2$ is readily reacted with an electrolyte solution under a high-voltage condition, the secondary cell tends to be deteriorated in charge/discharge cycle characteristics.

For this reason, it has been required to provide lithium cobaltate particles which are capable of producing secondary cells exhibiting excellent charge/discharge cycle characteristics even under high temperature conditions.

Hitherto, in order to improve various properties, e.g., in order to stabilize a crystal structure thereof, there are known a method of incorporating manganese into lithium cobaltate particles (Japanese Patent Publication (KOKOKU) No. 7-32017 (1995) and Japanese Patent Application Laid-Open (KOKAI) No. 4-28162 (1992)); a method of incorporating magnesium into lithium cobaltate particles (Japanese Patent Application Laid-Open (KOKAI) Nos. 6-168722 (1994), 11-102704 (1999), 2000-11993 and 2000-123834); a method of mixing manganese or magnesium with lithium cobaltate particles by a wet method (Japanese Patent Application Laid-Open (KOKAI) Nos. 10-1316 (1998) and 11-67205 (1999)); a method of controlling a lattice constant of lithium cobaltate to improve properties thereof (Japanese Patent Application Laid-Open (KOKAI) No. 6-181062 (1994)); or the like.

At present, it has been required to provide cathode active materials satisfying the above requirements. However, such cathode active materials have not been obtained until now.

That is, in Japanese Patent Application Laid-Open (KOKAI) Nos. 7-32017 (1995), 4-28162 (1992), 6-168722 (1994), 11-102704 (1999), 2000-11993 and 2000-123834, it is described that a cobalt compound, a lithium compound and manganese or magnesium are dry-mixed with each other, thereby obtaining lithium cobaltate particles containing manganese or magnesium. However, since the obtained lithium cobaltate particles have a non-uniform distribution of manganese or magnesium, the crystal structure thereof tends to undergo contraction and expansion upon the release and insertion reactions of lithium ions, resulting in destruction of the crystal lattice. Thus, the secondary cells using such lithium cobaltate particles fail to show excellent charge/discharge cycle characteristics under high temperature conditions.

In Japanese Patent Application Laid-Open (KOKAI) No. 10-1316 (1998), there is described the process for producing lithium cobaltate particles by dispersing a cobalt compound and manganese compound or magnesium compound in an aqueous lithium hydroxide solution and heat-treating the resultant dispersion. However, this process requires an additional hydrothermal treatment and, therefore, is industrially disadvantageous.

In Japanese Patent Application Laid-Open (KOKAI) No. 11-67205 (1999), there is described the process for producing lithium cobaltate particles by mixing a solution containing water-soluble salts of lithium, cobalt and manganese with a citric acid solution, gelling the resultant mixed solution by removing a solvent therefrom, and drying and sintering the obtained gel. However, the obtained lithium cobaltate particles have a large BET specific surface area and, therefore, undesirably show a high reactivity with an electrolyte solution when used in secondary cells.

Also, in Japanese Patent Application Laid-Open (KOKAI) No. 6-181062 (1994), there is described lithium cobaltate having a c-axis length of lattice constant of not less than 14.05 Å. However, secondary cells using the above lithium cobaltate cannot be sufficiently improved in charge/discharge cycle characteristics under high temperature conditions as compared to those using lithium cobaltate particles containing manganese or magnesium.

As a result of the present inventors' earnest studies for solving the above problems, it has been found that by adding an aqueous alkali solution to a solution containing a cobalt salt and a manganese salt with or without a manganese salt to conduct a neutralization reaction therebetween; oxidizing the resultant solution to obtain a cobalt oxide containing manganese or both manganese and magnesium; mixing the thus obtained cobalt oxide with a lithium compound; and heat-treating the resultant mixture, the obtained lithium cobaltate particles are useful as a cathode active material for a non-aqueous secondary cell not only having an excellent initial discharge capacity, but also exhibiting excellent charge/discharge cycle characteristics under high temperature conditions. The present invention has been attained based on the finding.

SUMMARY OF THE INVENTION

It is an object of the present invention to provide lithium cobaltate particles which are useful as a cathode active material for a non-aqueous secondary cell not only having an excellent initial discharge capacity but also exhibiting excellent charge/discharge cycle characteristics under high temperature conditions.

It is another object of the present invention to provide a process for producing the lithium cobaltate particles which are useful as a cathode active material for a non-aqueous secondary cell not only having an excellent initial discharge capacity required for secondary cells, but also exhibiting excellent charge/discharge cycle characteristics under high temperature conditions.

To accomplish the aim, in a first aspect of the present invention, there is provided a cathode active material for a non-aqueous electrolyte secondary cell, having a c-axis length of lattice constant of 14.080 to 14.160 Å, an average particle size of 0.1 to 5.0 μm, and a composition represented by the formula:

$$LiCo_{(1-x-y)}Mn_xMg_yO_2$$

wherein x is a number of 0.008 to 0.18; and y is a number of 0 to 0.18.

In a second aspect of the present invention, there is provided a process for producing the cathode active material for a non-aqueous electrolyte secondary cell, comprising:

adding an aqueous alkali solution to a solution containing a cobalt salt and a manganese salt with or without a magnesium salt to conduct a neutralization reaction therebetween;

oxidizing a resultant mixed solution by passing an oxygen-containing gas therethrough to obtain a cobalt oxide containing manganese or both manganese and magnesium;

mixing the cobalt oxide with a lithium compound; and heat-treating a resultant mixture of the cobalt oxide and the lithium compound.

In a third aspect of the present invention, there is provided a cathode active material for a non-aqueous electrolyte secondary cell, having a c-axis length of lattice constant of 14.080 to 14.160 Å, an average particle size of 0.1 to 5.0 μm, and a composition represented by the formula:

$$LiCo_{(1-x-y)}Mn_xMg_yO_2$$

wherein x is a number of 0.008 to 0.18; and y is a number of 0 to 0.18, produced by a process comprising:

adding an aqueous alkali solution to a solution containing a cobalt salt and a manganese salt with or without a magnesium salt to conduct a neutralization reaction therebetween;

oxidizing a resultant mixed solution by passing an oxygen-containing gas therethrough to obtain a cobalt oxide containing manganese or both manganese and magnesium;

mixing the cobalt oxide with a lithium compound; and heat-treating a resultant mixture of the cobalt oxide and the lithium compound.

In a fourth aspect of the present invention, there is provided a cathode active material for a non-aqueous electrolyte secondary cell, having a c-axis length of lattice constant of 14.080 to 14.160 Å, an a-axis length of lattice constant of 2.81 to 2.83 Å, a crystallite size of 400 to 1,200 Å, an average particle size of 0.1 to 5.0 μm, and a composition represented by the formula:

$$LiCo_{(1-x-y)}Mn_xMg_yO_2$$

wherein x is a number of 0.008 to 0.18; and y is a number of 0 to 0.18.

In a fifth aspect of the present invention, there is provided a cathode active material for a non-aqueous electrolyte secondary cell, having a c-axis length of lattice constant of 14.080 to 14.160 Å, an a-axis length of lattice constant of 2.81 to 2.83 Å, a crystallite size of 400 to 1,200 Å, an average particle size of 0.1 to 5.0 μm, and a composition represented by the formula:

$$LiCo_{(1-x-y)}Mn_xMg_yO_2$$

wherein x is a number of 0.008 to 0.18; and y is a number of 0.01 to 0.15.

In a sixth aspect of the present invention, there is provided a non-aqueous electrolyte secondary cell comprising a lithium ion conductive electrolyte and a pair of electrodes separated by means of a separator, wherein at least one of said electrodes comprises a cathode active material having a c-axis length of lattice constant of 14.080 to 14.160 Å, an average particle size of 0.1 to 5.0 μm, and a composition represented by the formula:

$$LiCo_{(1-x-y)}Mn_xMg_yO_2$$

wherein x is a number of 0.008 to 0.18; and y is a number of 0 to 0.18.

DETAILED DESCRIPTION OF THE INVENTION

The present invention will be described in detail below.

First, the lithium cobaltate particles as a cathode active material according to the present invention are described.

The cathode active material of the present invention is made of lithium cobaltate particles containing manganese or both manganese and magnesium. The cathode active material has a composition represented by the following formula:

$$LiCo_{(1-x-y)}Mn_xMg_yO_2$$

The manganese content x is usually 0.008 to 0.18, preferably 0.01 to 0.15. When the manganese content x is less than 0.008, the effect of improving charge/discharge cycle characteristics of secondary cells under high temperature conditions may be insufficient. When the manganese content x is more than 0.18, the initial discharge capacity thereof may be remarkably deteriorated. When magnesium is further incorporated into the cathode active material, it may become possible to further enhance the charge/discharge cycle characteristics under high temperature conditions. The magnesium content y is usually not more than 0.18, preferably 0.01 to 0.15, more preferably 0.001 to 0.1, still more preferably 0.01 to 0.07. When the magnesium content y is more than 0.18, the effect of increasing the capacity may be insufficient.

The cathode active material of the present invention has a c-axis length of lattice constant of usually 14.080 to 14.160 Å, preferably 14.080 to 14.153 Å, more preferably 14.085 to 14.153 Å. When the c-axis length of lattice constant is less than 14.080 Å, the crystal lattice of the cathode active material undergoes remarkable contraction and expansion upon the release and insertion reactions of lithium ions, resulting in deterioration in charge/discharge cycle characteristics of secondary cells under high temperature conditions. Although the cathode active material having a c-axis length of lattice constant of more than 14.160 Å is obtainable by increasing the amount of manganese replaced, such an active material is deteriorated in initial discharge capacity. In addition, the cathode active material of the present invention has an a-axis length of lattice constant of preferably 2.81 to 2.83 Å, more preferably 2.815 to 2.825 Å.

The cathode active material of the present invention has an average particle size of usually 0.1 to 5.0 $\mu$m preferably 0.5 to 5.0 $\mu$m, more preferably 1.5 to 5.0 $\mu$m, still more preferably 2.0 to 5.0 $\mu$m. When the average particle size is less than 0.1 $\mu$m, the obtained active material may suffer from disadvantages such as low packing density and increased reactivity with an electrolyte solution. Also, it may be industrially difficult to produce such a cathode active material having an average particle size of more than 5.0 $\mu$m.

The cathode active material of the present invention has a BET specific surface area of preferably 0.1 to 2.5 $m^2/g$, more preferably 0.1 to 2.0 $m^2/g$, still more preferably 0.1 to 1.7 $m^2/g$. It may be industrially difficult to produce such a cathode active material having a BET specific surface area of less than 0.1 $m^2/g$. When the BET specific surface area is more than 2.5 $m^2/g$, the obtained active material may tend to suffer from disadvantages such as low packing density and increased reactivity with an electrolyte solution.

The cathode active material of the present invention has a crystallite size of preferably 400 to 1,200 Å, more preferably 450 to 1,000 Å, still more preferably 500 to 850 Å.

The secondary cell produced using the cathode active material of the present invention exhibits an initial discharge capacity of preferably 135 to 160 mAh/g, more preferably 140 to 160 mAh/g, still more preferably 150 to 160 mAh/g, and a capacity retention percentage after 50 cycles at 60° C., of preferably 90 to 99%, more preferably 92 to 99%, still more preferably 95 to 99%.

Next, the process for producing the cathode active material according to the present invention will be described below.

The cathode active material of the present invention can be produced by mixing a cobalt oxide containing manganese or both manganese and magnesium with a lithium compound, and heat-treating the resultant mixture.

The cobalt oxide containing manganese or both manganese and magnesium may be produced by mixing an aqueous cobalt salt solution with an aqueous manganese salt solution or an aqueous solution containing a manganese salt and a magnesium salt, adding alkali to the resultant mixed solution to conduct a neutralization reaction therebetween, and then subjecting the obtained solution to oxidation reaction.

Examples of the alkali may include aqueous solutions of sodium hydroxide, potassium hydroxide, sodium carbonate, ammonia and the like. Among these aqueous solutions, an aqueous sodium hydroxide solution, an aqueous sodium carbonate solution and a mixed solution thereof are preferred.

The amount of the manganese salt added is usually 0.1 to 20 mol %, preferably 2 to 18 mol % (calculated as manganese) based on cobalt. The amount of the magnesium salt added is usually not more than 20 mol %, preferably 0.1 to 20 mol %, more preferably 1 to 18 mol % (calculated as magnesium) based on cobalt.

The alkali used for the neutralization reaction may be used in such an amount that the equivalent ratio of the alkali to the neutralized component of whole metal salt contained in hydroxides of cobalt and manganese or hydroxides of cobalt, manganese and magnesium, is preferably 1.0 to 1.2.

The oxidation reaction may be conducted by passing an oxygen-containing gas, e.g., air through the solution. The oxidation reaction temperature is preferably not less than 30° C., more preferably 30 to 95° C., and the oxidation reaction time is preferably 5 to 20 hours.

The cobalt oxide containing manganese or both manganese and magnesium has an average particle size of usually 0.01 to 2.0 $\mu$m, preferably 0.05 to 1.0 $\mu$m; and a BET specific surface area of usually 0.5 to 50 $m^2/g$, preferably 10 to 40 $m^2/g$.

In the cobalt oxide containing manganese or both manganese and magnesium, manganese atoms or both manganese and magnesium atoms are uniformly distributed in the cobalt oxide when observed at atomic level. Therefore, when such a cobalt oxide is mixed with the lithium compound and the resultant mixture is heat-treated, the cobalt sites thereof may be uniformly replaced with the manganese atoms or manganese and magnesium atoms.

As described above, the cobalt oxide containing manganese or both manganese and magnesium is mixed with the lithium compound, and the resultant mixture is then heat-treated.

The mixing of the cobalt oxide containing manganese or both manganese and magnesium, with the lithium compound may be conducted by either dry or wet method as long as a uniform mixture can be obtained.

The mixing molar ratio of lithium to cobalt and manganese is 0.95 to 1.05.

The heat-treating temperature is preferably 600 to 950° C., at which $LiCoO_2$ in the form of a high-temperature regular phase can be produced. When the heat-treating temperature is less than 600° C., $LiCoO_2$ produced may be made of a low-temperature phase having a pseudo-spinel structure. When the heat-treating temperature is more than 950° C., $LiCoO_2$ produced may be made of a high-temperature irregular phase in which lithium and cobalt are dispersed at random positions.

In the case where a cathode is produced using the cathode active material of the present invention, the cathode active material is mixed with a conductive agent and a binder by an ordinary method. As the preferred conductive agent, there may be exemplified acetylene black, carbon black, graphite or the like. As the preferred binder, there may be exemplified polytetrafluoroethylene, polyvinylidene fluoride or the like.

A secondary cell (lithium battery) according to the present invention comprises a pair of electrodes disposed by means of a separator in the presence of a lithium ion conductive electrolyte.

A cathode and an anode are disposed in a case so as to be opposed to each other with a separator composed of a porous thermoplastic resin film. A lithium ion conductive electrolyte is present in the case.

In the secondary cell of the present invention, it is only necessary that the above-described specific cathode active material is used for at least one electrode, preferably a cathode active material, and the other active materials may be the known substances which are conventionally used for a lithium battery.

The secondary cell containing the cathode active material of the present invention, is produced by using the above cathode in combination with an anode and an electrolyte solution.

As an active material for the anode, there may be used metallic lithium, lithium/aluminum alloy, lithium/tin alloy, graphite or the like.

In addition, as a solvent for the electrolyte solution, there may be used a mixed solvent of ethylene carbonate and diethyl carbonate, an organic solvent containing at least one solvent selected from the group consisting of carbonates such as propylene carbonate and dimethyl carbonate, and ethers such as dimethoxyethane, and the like.

Further, as the electrolyte solution, there may be used a solution prepared by dissolving lithium phosphate hexafluoride in the above solvent as well as those solutions prepared by dissolving at least one lithium salt selected from the group consisting of lithium perchlorate, lithium borate tetrafluoride and the like, in the solvent.

The point of the present invention is that the secondary cell produced using the cathode active material composed of lithium cobaltate particles containing manganese or both manganese and magnesium not only can retain an adequate initial discharge capacity required for secondary cells, but also can exhibit excellent charge/discharge cycle characteristics even under high temperature conditions.

The reason why the secondary cell produced using the cathode active material of the present invention can retain an adequate initial discharge capacity, is considered as follow. That is, the cathode active material contains manganese or both manganese and magnesium in such amounts as not to deteriorate the inherent initial discharge capacity of $LiCoO_2$.

The reason why the cathode active material of the present invention exhibits a large c-axis length of lattice constant, is considered by the present inventors as follows. That is, since manganese or both manganese and magnesium are incorporated into the cobalt oxide by a wet oxidation reaction, manganese atoms or both manganese and magnesium atoms are uniformly distributed in cobalt when observed at atomic level. Therefore, it is suggested that in the cathode active material obtained from such a cobalt oxide, the cobalt sites in the active material can be uniformly replaced with manganese and magnesium atoms.

Further, since the cathode active material has a large c-axis length of lattice constant, the release and insertion reactions of lithium ions are readily performed, so that the contraction and expansion of the crystal structure in the c-axis direction thereof is inhibited upon the reactions, thereby preventing destruction of the crystal lattice. As a result, it is suggested that the secondary cell produced using such a cathode active material is excellent in charge/discharge cycle characteristics under high temperature conditions.

On the other hand, when the lithium compound, the cobalt compound, and manganese compound or magnesium compound are dry-mixed with each other and then calcined, manganese atoms or magnesium atoms cannot be uniformly distributed in the active material, thereby failing to obtain the effect of the present invention.

By using the cathode active material of the present invention, it becomes possible to obtain a non-aqueous electrolyte secondary cell capable of maintaining an initial discharge capacity required as the secondary cell, and exhibiting improved charge/discharge cycle characteristics under high temperature conditions.

EXAMPLES

The present invention is described in more detail by Examples and Comparative Examples, but the Examples are only illustrative and, therefore, not intended to limit the scope of the present invention thereto.

Various properties were measured by the following methods.

(1) The cathode active material was measured and identified using a Powder X-ray Diffraction Analyzer manufactured by Rigaku Denki Kogyo Co., Ltd. (Cu-Kα; 40 kV; 40 mA). Also, the lattice constant of the active material was calculated from respective diffraction peaks of the powder X-ray diffraction curve obtained above.

(2) The crystallite size of the cathode active material was calculated from the respective diffraction peaks of the powder X-ray diffraction curve obtained above.

(3) The elemental analysis was conducted using an inductively coupled high-frequency plasma atomic emission spectroscope "SPS-4000 Model" manufactured by Seiko Denshi Kogyo Co., Ltd.

(4) The cell characteristics of the cathode active material were evaluated by a coin-shaped cell constituted from a cathode, an anode and an electrolyte solution prepared by the following methods.

Preparation of Cathode

The cathode active material, acetylene black as a conductive agent, and polyvinylidene fluoride as a binder were accurately weighed at a weight ratio of 85:10:5, and intimately mixed with each other in a mortar. The resultant mixture was dispersed in N-methyl-2-pyrrolidone to prepare a cathode slurry. Then, the obtained slurry was applied onto an aluminum foil as a current collector to form a coating film having a thickness of 150 μm, vacuum-dried at 150° C., and then punched into a disc shape having a diameter of 16 mm, thereby producing a cathode.

Preparation of Anode

A metallic lithium foil was punched into a disc shape having a diameter of 16 mm, thereby producing an anode.

Preparation of Electrolyte Solution

Lithium phosphate hexafluoride ($LiPF_6$) as an electrolyte was added in an amount of 1 mol/liter into a mixed solution containing ethylene carbonate and diethyl carbonate at a volume ratio of 50:50, thereby preparing an electrolyte solution.

Assembling of Coin-Shaped Cell

In a globe box maintained under an argon atmosphere, the above positive and anodes were fitted via a polypropylene separator in a casing made of SUS316 stainless steel. Further, the electrolyte solution was filled in the casing, thereby producing a CR2032-type coin-shaped cell.

Evaluation of Cell

The above-produced coin-shaped cell was subjected to a charge/discharge cycle test for secondary cells. The charge and discharge cycles were repeated at a temperature of 60° C. and a cathode current density of 0.2 $MA/cm^2$ while varying the cut-off voltage from 3.0 to 4.25 V.

Example 1
Production of Cathode Active Material 109.5 ml of manganese sulfate (5 mol % based on cobalt) was added to 5,800 ml of an aqueous solution containing cobalt in an amount of 0.5 mol/liter. In addition, an aqueous sodium hydroxide solution was added in an amount of 1.05 equivalents based on one equivalent of a neutralized component of cobalt and manganese, to the resultant mixed solution, thereby conducting a neutralization reaction therebetween. Then, the obtained solution was subjected to oxidation reaction at 90° C. for 8 hours while passing air therethrough, thereby obtaining 240.8 g of a manganese-containing cobalt oxide. It was conformed that the thus obtained manganese-containing cobalt oxide was $Co_3O_4$, and had a manganese content of 5 mol %, an average particle size of 0.05 µm and a BET specific surface area of 23 m²/g.

The manganese-containing cobalt oxide was intimately mixed with a lithium compound such that the molar ratio of Li to Co plus manganese was 1.03. The resultant mixed particles were calcined at 900° C. for 10 hours under an oxidative atmosphere, thereby obtaining manganese-containing lithium cobaltate particles.

It was confirmed that the thus obtained manganese-containing lithium cobaltate particles had an average particle size of 1.0 µm, a BET specific surface area of 0.6 m²/g, an a-axis length of lattice constant of 2.820 Å, a c-axis length of lattice constant of 14.100 and a crystallite size of 642 Å. In addition, when the composition of the manganese-containing lithium cobaltate particles was represented by the formula: $LiCo_{1-x}Mn_xO_2$, it was confirmed that the manganese content x was 0.05.

The thus obtained manganese-containing lithium cobaltate particles were used as a cathode active material to prepare a coin-shaped cell. As a result, it was confirmed that the thus prepared cell exhibited an initial discharge capacity of 150 mAh/g, and a capacity retention percentage of 97% after 50 cycles at 60° C.

Examples 2 to 8 and Comparative Examples 1 to 6

The same procedure as defined in Example 1 was conducted except that the contents of manganese and magnesium were changed variously, thereby obtaining a cathode active material. Then, a coin-shaped cell was produced using the cathode active material by the same method as defined in Example 1.

Production conditions and various properties of the obtained cathode active material and cell characteristics of the obtained coin-shaped cell are shown in Tables 1 to 3.

Meanwhile, in Comparative Examples 5 and 6, the respective raw materials were mixed together by a dry-mixing method, and then the resultant mixture was calcined, thereby obtaining a cathode active material.

As apparent from Table 1, it was confirmed that the coin-shaped cells produced using the cathode active materials of the present invention exhibited an initial discharge capacity of not less than 140 mAh/g, and a capacity retention percentage after 50 cycles at 60° C. as high as not less than 95%.

On the contrary, as apparent from the results of Comparative Examples, when the manganese content x is less than 0.008, the effect of adding manganese to the cathode active material was insufficient. When the manganese content x is more than 0.18, the initial discharge capacity of the obtained cell became too deteriorated.

Also, in the production of the lithium cobaltate particles, in the case where, upon the production of the cobalt oxide particles from the aqueous solutions, cobalt oxide particles containing only magnesium was used, and in the case where the respective raw components were dry-mixed together, it was confirmed that the effect of improving the charge/discharge cycle characteristics under high temperature conditions was not attained.

TABLE 1

| | Production of Mn-containing cobalt oxide | | | |
|---|---|---|---|---|
| Examples and Comparative Examples | Amount of aqueous Co solution (ml) | Co concentration (mol/liter) | Amount of Mn added (ml) | Ratio of Mn added (Mn/Co) (mol %) |
| Example 1 | 5,800 | 0.5 | 109.5 | 5 |
| Example 2 | 5,800 | 0.5 | 21.9 | 1 |
| Example 3 | 5,800 | 0.5 | 328.5 | 15 |
| Example 4 | 5,800 | 0.5 | 21.9 | 1 |
| Example 5 | 5,800 | 0.5 | 21.9 | 1 |
| Example 6 | 5,800 | 0.5 | 54.8 | 2.5 |
| Example 7 | 5,800 | 0.5 | 54.8 | 2.5 |
| Example 8 | 5,800 | 0.5 | 109.5 | 5 |
| Example 9 | 5,800 | 0.5 | 109.5 | 5 |
| Comparative Example 1 | 5,800 | 0.5 | 0 | 0 |
| Comparative Example 2 | 5,800 | 0.5 | 11.0 | 0.5 |
| Comparative Example 3 | 5,800 | 0.5 | 438.0 | 20 |
| Comparative Example 4 | 5,800 | 0.5 | 0 | 0 |
| Comparative Example 5 | — | — | — | — |
| Comparative Example 6 | — | — | — | — |

| | Production of Mn-containing cobalt oxide | | | |
|---|---|---|---|---|
| Examples and Comparative Examples | Amount of Mg added (g) | Ratio of Mg added (Mg/Co) (mol %) | Kind of aqueous alkali solution | Amount of aqueous alkali solution (liter) |
| Example 1 | 0 | 0 | NaOH | 0.349 |
| Example 2 | 0 | 0 | NaOH | 0.336 |
| Example 3 | 0 | 0 | NaOH | 0.382 |
| Example 4 | 7.39 | 1 | NaOH | 0.339 |
| Example 5 | 7.39 | 1 | NaOH | 0.339 |
| Example 6 | 0 | 0 | NaOH | 0.341 |
| Example 7 | 18.48 | 2.5 | NaOH | 0.349 |
| Example 8 | 0 | 0 | NaOH | 0.349 |
| Example 9 | 36.96 | 5 | NaOH | 0.365 |
| Comparative Example 1 | 0 | 0 | NaOH | 0.333 |
| Comparative Example 2 | 0 | 0 | NaOH | 0.334 |
| Comparative Example 3 | 0 | 0 | NaOH | 0.398 |
| Comparative Example 4 | 36.96 | 5 | NaOH | 0.349 |
| Comparative Example 5 | — | — | — | — |
| Comparative Example 6 | — | — | — | — |

| | Production of Mn-containing cobalt oxide | | |
|---|---|---|---|
| Examples and Comparative Examples | Amount of alkali added (equivalent ratio) | Oxidation reaction temperature (° C.) | Oxidation reaction time (hour) |
| Example 1 | 1.02 | 90 | 8 |
| Example 2 | 1.02 | 90 | 8 |
| Example 3 | 1.02 | 90 | 8 |
| Example 4 | 1.02 | 90 | 8 |
| Example 5 | 1.02 | 90 | 8 |
| Example 6 | 1.02 | 90 | 8 |
| Example 7 | 1.02 | 90 | 8 |
| Example 8 | 1.02 | 90 | 8 |
| Example 9 | 1.02 | 90 | 8 |

TABLE 1-continued

| | | | |
|---|---|---|---|
| Comparative Example 1 | 1.02 | 90 | 8 |
| Comparative Example 2 | 1.02 | 90 | 8 |
| Comparative Example 3 | 1.02 | 90 | 8 |
| Comparative Example 4 | 1.02 | 90 | 8 |
| Comparative Example 5 | — | — | — |
| Comparative Example 6 | — | — | — |

TABLE 2

Properties of cobalt oxide particles

| Examples and Comparative Examples | Mn content (molar ratio) | Mg content (molar ratio) | Average particle size (μm) | BET specific surface area (m²/g) |
|---|---|---|---|---|
| Example 1 | 5 | 0 | 0.05 | 23 |
| Example 2 | 1 | 0 | 0.05 | 23 |
| Example 3 | 15 | 0 | 0.05 | 23 |
| Example 4 | 1 | 1 | 0.05 | 23 |
| Example 5 | 1 | 1 | 0.05 | 23 |
| Example 6 | 2.5 | 0 | 0.05 | 23 |
| Example 7 | 2.5 | 2.5 | 0.05 | 23 |
| Example 8 | 5 | 0 | 0.05 | 23 |
| Example 9 | 5 | 5 | 0.05 | 23 |
| Comparative Example 1 | 0 | 0 | 0.05 | 23 |
| Comparative Example 2 | 0.5 | 0 | 0.05 | 23 |
| Comparative Example 3 | 20 | 0 | 0.05 | 23 |
| Comparative Example 4 | 0 | 5 | 0.05 | 23 |
| Comparative Example 5 | — | — | 2.5 | 1.3 |
| Comparative Example 6 | — | — | 2.5 | 1.3 |

Production method of lithium cobaltate particles

| Examples and Comparative Examples | Kind of lithium compound | Molar ratio of lithium [Li/Mn + Mg + Co)] | Calcination temperature (° C.) | Calcination time (hour) |
|---|---|---|---|---|
| Example 1 | Li₂CO₃ | 1.03 | 900 | 10 |
| Example 2 | Li₂CO₃ | 1.03 | 900 | 10 |
| Example 3 | Li₂CO₃ | 1.03 | 900 | 10 |
| Example 4 | Li₂CO₃ | 1.03 | 900 | 10 |
| Example 5 | Li₂CO₃ | 1.03 | 950 | 10 |
| Example 6 | Li₂CO₃ | 1.035 | 950 | 10 |
| Example 7 | Li₂CO₃ | 1.03 | 900 | 10 |
| Example 8 | Li₂CO₃ | 1.03 | 930 | 10 |
| Example 9 | Li₂CO₃ | 1.03 | 900 | 10 |
| Comparative Example 1 | Li₂CO₃ | 1.03 | 900 | 10 |
| Comparative Example 2 | Li₂CO₃ | 1.03 | 900 | 10 |
| Comparative Example 3 | Li₂CO₃ | 1.03 | 900 | 10 |
| Comparative Example 4 | Li₂CO₃ | 1.03 | 900 | 10 |
| Comparative Example 5 | Li₂CO₃ | 1.02 | 900 | 10 |
| Comparative Example 6 | Li₂CO₃ | 1.03 | 900 | 10 |

TABLE 3

| Examples and Comparative Examples | Properties of cathode active material | | | |
|---|---|---|---|---|
| | Mn content (x) | Mg content (y) | Lattice constant (Å) a-axis | Lattice constant (Å) c-axis |
| Example 1 | 0.05 | 0 | 2.820 | 14.100 |
| Example 2 | 0.01 | 0 | 2.817 | 14.085 |
| Example 3 | 0.15 | 0 | 2.817 | 14.150 |
| Example 4 | 0.01 | 0.01 | 2.817 | 14.089 |
| Example 5 | 0.01 | 0.01 | 2.817 | 14.089 |
| Example 6 | 0.025 | 0 | 2.817 | 14.091 |
| Example 7 | 0.025 | 0.025 | 2.819 | 14.095 |
| Example 8 | 0.05 | 0 | 2.819 | 14.101 |
| Example 9 | 0.05 | 0.05 | 2.819 | 14.105 |
| Comparative Example 1 | 0 | 0 | 2.817 | 14.052 |
| Comparative Example 2 | 0.005 | 0 | 2.817 | 14.064 |
| Comparative Example 3 | 0.2 | 0 | 2.817 | 14.167 |
| Comparative Example 4 | 0 | 0.05 | 2.819 | 14.072 |
| Comparative Example 5 | 0.025 | 0 | 2.817 | 14.069 |
| Comparative Example 6 | 0.05 | 0 | 2.817 | 14.075 |

| Examples and Comparative Examples | Properties of cathode active material | | |
|---|---|---|---|
| | Particle size (μm) | BET specific surface area (m²/g) | Crystallite size (Å) |
| Example 1 | 1.0 | 0.6 | 642 |
| Example 2 | 1.0 | 0.6 | 612 |
| Example 3 | 0.5 | 0.9 | 683 |
| Example 4 | 0.5 | 0.6 | 638 |
| Example 5 | 4.0 | 0.5 | 792 |
| Example 6 | 5.0 | 0.4 | 813 |
| Example 7 | 0.5 | 0.9 | 598 |
| Example 8 | 3.0 | 0.5 | 728 |
| Example 9 | 0.5 | 0.9 | 604 |
| Comparative Example 1 | 3.0 | 0.5 | 842 |
| Comparative Example 2 | 1.0 | 0.9 | 651 |
| Comparative Example 3 | 0.5 | 0.9 | 632 |
| Comparative Example 4 | 3.0 | 0.5 | 785 |
| Comparative Example 5 | 5.0 | 0.4 | 788 |
| Comparative Example 6 | 7.0 | 0.3 | 999 |

| Examples and Comparative Examples | Properties of secondary cell | |
|---|---|---|
| | Initial discharge capacity (mAh/g) | Capacity retention percentage after 50 cycles (%/50cy.) |
| Example 1 | 150 | 97 |
| Example 2 | 149.8 | 95 |
| Example 3 | 140.2 | 97 |
| Example 4 | 147.8 | 95 |
| Example 5 | 148 | 96 |
| Example 6 | 147.2 | 97 |
| Example 7 | 145.1 | 96 |
| Example 8 | 150 | 97 |
| Example 9 | 155.1 | 98 |
| Comparative Example 1 | 149.5 | 85 |
| Comparative Example 2 | 149.2 | 87 |
| Comparative Example 3 | 131.1 | 88 |
| Comparative | 147.8 | 89 |

TABLE 3-continued

| | | |
|---|---|---|
| Example 4 Comparative Example 5 | 146.7 | 83 |
| Comparative Example 6 | 148.4 | 84 |

What is claimed is:

1. A cathode active material for a non-aqueous electrolyte secondary cell, having a c-axis length of lattice constant of 14.080 to 14.160 Å, an average particle size of 0.1 to 5.0 μm, and a composition represented by the formula:

$$LiCo_{(1-x-y)}Mn_xMg_yO_2$$

wherein x is a number of 0.008 to 0.18; and y is a number of 0 to 0.18.

2. A cathode active material according to claim 1, which has an a-axis length of lattice constant of 2.81 to 2.83 Å.

3. A cathode active material according to claim 1, which has a BET specific surface area of 0.1 to 2.5 m²/g and a crystallite size of 400 to 1,200 Å.

4. A cathode active material according to claim 1, wherein y is 0.01 to 0.15.

5. A cathode active material for a non-aqueous electrolyte secondary cell having a c-axis length of lattice constant of 14.080 to 14.160 Å, an average particle size of 0.1 to 5.0 μm, and a composition represented by the formula:

$$LiCo_{(1-x-y)}Mn_xMg_yO_2$$

wherein x is a number of 0.008 to 0.18; and y is a number of 0 to 0.18.

6. A cathode active material for a non-aqueous electrolyte secondary cell, having a c-axis length of lattice constant of 14.080 to 14.160 Å, an a-axis length of lattice constant of 2.81 to 2.83 Å, a crystallite size of 400 to 1,200 Å, an average particle size of 0.1 to 5.0 μm, and a composition represented by the formula:

$$LiCo_{(1-x-y)}Mn_xMg_yO_2$$

wherein x is a number of 0.008 to 0.18; and y is a number of 0 to 0.18.

7. A cathode active material for a non-aqueous electrolyte secondary cell, having a c-axis length of lattice constant of 14.080 to 14.160 Å, an a-axis length of lattice constant of 2.81 to 2.83 Å, a crystallite size of 400 to 1,200 Å, an average particle size of 0.1 to 5.0 μm, and a composition represented by the formula:

$$LiCo_{(1-x-y)}Mn_xMg_yO_2$$

wherein x is a number of 0.008 to 0.18; and y is a number of 0.010 to 0.15.

8. A non-aqueous electrolyte secondary cell comprising a lithium ion conductive electrolyte and a pair of electrodes separated by means of a separator, wherein at least one of said electrodes comprises a cathode active material having a c-axis length of lattice constant of 14.080 to 14.160 Å, an average particle size of 0.1 to 5.0 μm, and a composition represented by the formula:

$$LiCo_{(1-x-y)}Mn_xMg_yO_2$$

wherein x is a number of 0.008 to 0.18; and y is a number of 0 to 0.18.

* * * * *